United States Patent
McKeand

(10) Patent No.: US 6,699,528 B2
(45) Date of Patent: Mar. 2, 2004

(54) PROCESS FOR PREPARING CORROSION-RESISTANT METAL ARTICLES FOR MARINE APPLICATIONS

(76) Inventor: Scott J. McKeand, 286 Croswell Rd., Croswell, MI (US) 48422

( * ) Notice: Subject to any disclaimer, the term of this patent is extended or adjusted under 35 U.S.C. 154(b) by 111 days.

(21) Appl. No.: 10/066,894

(22) Filed: Feb. 4, 2002

(65) Prior Publication Data

US 2003/0148037 A1 Aug. 7, 2003

(51) Int. Cl.⁷ .................................................. B05D 1/02
(52) U.S. Cl. .................. 427/421; 427/383.5; 427/407.1
(58) Field of Search .............................. 427/421, 385.5, 427/407.1

(56) References Cited

U.S. PATENT DOCUMENTS

| | | |
|---|---|---|
| 4,267,299 A | 5/1981 | Oechsle, III |
| 4,507,456 A | 3/1985 | Blum et al. |
| 4,543,393 A | 9/1985 | Blum et al. |
| 4,578,446 A | 3/1986 | House et al. |
| 4,695,618 A | 9/1987 | Mowrer |
| 4,720,536 A | 1/1988 | House et al. |
| 5,059,672 A | 10/1991 | Engebretson |
| 5,183,877 A | 2/1993 | Swanson |
| 5,233,009 A | 8/1993 | Madan et al. |
| 5,284,918 A | 2/1994 | Huynh-Tran et al. |
| 5,391,686 A | 2/1995 | Jadhav et al. |
| 5,670,215 A | 9/1997 | Oakes |
| 5,760,155 A | 6/1998 | Mowrer et al. |

*Primary Examiner*—Bernard Pianalto
(74) *Attorney, Agent, or Firm*—Brooks Kushman P.C.

(57) ABSTRACT

Spray on polyurethaneurea coatings provide corrosion resistance over long periods of time to marine fixtures, particularly of active metals such as aluminum and steel. Radar arches, fishing platforms, railing systems, etc. can maintain their aesthetics over extended periods of time, even in salt water environments, when the coating has been penetrated to the metal surface.

12 Claims, No Drawings

PROCESS FOR PREPARING CORROSION-RESISTANT METAL ARTICLES FOR MARINE APPLICATIONS

BACKGROUND OF THE INVENTION

1. Field of the Invention

The present invention is directed to a process for preparing corrosion-resistant articles for marine use, and the products prepared by the process.

2. Background Art

Metal articles and structures are widely used in the marine field, particularly in pleasure craft, fishing boats, and the like. Unless stainless steel or certain marine bronzes are used to manufacture such articles, corrosion, with its associated aesthetic problems and failure modes can be expected to severely limit product lifetime. Even when these two relatively corrosion-resistant classes of materials are used, corrosion may still take place, particularly in salt water or brackish environments. It is partially for this reason that pleasure boats operated in salt water have considerably lower resale value than similar vessels operated in fresh water.

Corrosion problems are most severe when more active metals such as magnesium, aluminum, and carbon steel are used. Such items may become severely corroded over relatively short periods of time in salt water environments.

To lessen the corrosive effects on metals, it has been common to provide surface treatments. Chrome and nickel plating have been used, for example. However, plating is relatively expensive, particularly when large fabricated structures constructed by welding are to be plated. In addition, such plating procedures do not work well on many active metals such as aluminum.

Anodizing has also been used to increase corrosion resistance, and is effectively used on small parts. However, large tubular structures such as radar arches are typically welded together. The anodized coating is destroyed locally during the welding process. Anodizing very large, prefabricated structures is not cost-effective.

Painting has long been used to provide corrosion resistance, and literally hundreds, if not thousands, of coating systems have been proposed. Powder coating systems, for example using epoxy-type powdered resins which are subsequently heat cured can produce excellent finishes. However, powder coating of large articles becomes expensive due to the size of the cure oven necessary. Moreover, powder coating systems exhibit the same corrosion deficiencies associated with other coatings.

Use of conventional, solvent-borne coatings is becoming increasingly difficult due to environmental legislation limiting emissions of volatile organic compounds (VOCs). Moreover, most such coatings do not provide the necessary levels of corrosion protection, and application to substrates involves a time and labor-extensive combination of primer application, smoothing filler, and topcoat application, with numerous sanding and smoothing steps in-between.

A problem with coatings subject to corrosion occurs when a prefabricated structure is altered to mount to non-standard surfaces or to mount additional components thereon. For example, flybridges and radar arches are often used to mount flag holders, GPS and RF antennae, hand holds, cleats, "rocket launcher" fishing pole receptacles, and the like. Drilling the necessary mounting holes into the coated structure penetrates the coating, exposing untreated metal to the environment. Corrosion rapidly occurs at such areas, frequently spreading between the coating and its metal substrate causing ultimate separation of the coating.

It would be desirable to provide a process by which metal (and non-metal) articles slated for marine use could be coated with a corrosion-resistant coating employing a minimum of finishing steps. It would further be desirable to provide a coating which offers extended corrosion resistance even after having had bare metal exposed.

SUMMARY OF THE INVENTION

It has now been surprisingly discovered, that a two-part polyurethaneurea coating derived from a low viscosity isocyanate-terminated prepolymer and a mixture of diamine and hydroxyl-functional curing agents can be applied to marine products by conventional spraying techniques to produce a smooth, corrosion-resistant coating which maintains its corrosion resistance even after exposure of bare metal to the environment by penetration of the coating, and even under salt spray conditions.

DETAILED DESCRIPTION OF THE PREFERRED EMBODIMENTS

The process of the present invention involves coating marine articles with a two-part coating polyurethaneurea composition at elevated temperature, and allowing the coating to cure to a corrosion-resistant film.

The articles to be coated include both metal and non-metal articles to be used in marine environments. Preferably, the articles are metal items used as fittings and structures on watercraft. Non-limiting examples include cleats, plates antennas, antenna mounts, radar arches, bow rails, rub rails, fishing pole holders, downrigger mounts, rails, stanchions, swim platform supports, exhaust ports, mast bases, back stays, chain plates, transom, swim, and boarding ladders, tuna towers, fishing platforms, flybridges, anchors, anchor rollers, and the like. The metal substrate may be any metal, for example brass, bronze, bright metal, zinc, magnesium, aluminum, steel, stainless steel, and the like. Preferred are steel (non-stainless), stainless steel, chrome-plated metals, aluminum, and magnesium. Terms such as aluminum, magnesium, bronze, etc. include the various alloys of these metals. Preferred non-metal substrates are thermoplastic sheet material and fiber-reinforced thermoset and fiber-reinforced thermoplastics. Fiber reinforcement of the latter includes fiberglass, thermoplastic fiber, carbon fiber, ceramic fiber, etc., whether in the form of strands, tow, yarn, woven or non-woven products, felted products, and whether the fiber reinforcement is short fiber, long fiber, continuous fiber, etc.

The two-part polyurethaneurea coating is supplied in at least two components to a spray gun. Although it is possible to supply three or more components, it is simple and most economical to supply the components in what are conventionally termed "A-side" and "B-side" components, the A-side containing the isocyanate-functional components and the B-side containing the isocyanate-reactive components.

Both the A-side and B-side desirably have viscosities which are below 500 cp at the spray temperature in order for sufficient mixing and atomization to take place. However, higher viscosities are possible provided suitable mixing and atomization can be achieved.

The components are preferably VOC-free. By VOC-free is meant that no added solvent is employed. The coating components are substantially 100% solids. However, it is possible to add minor amounts of solvent, particularly when component viscosity is higher than desired. In such cases, addition of up to 20 weight percent solvent, more preferably 10 weight percent or less, and most preferably 5 weight percent or less of solvent may be practiced. When solvent is added, it is preferably that the solvent be a "zero-VOC" solvent, i.e., a solvent which is not viewed as contributing to environmental problems. Such solvents are known, for example, in U.S. Pat. No. 6,048,471. An example of such a solvent is τ-butylacetate. Mixtures of such solvents may also be used.

The A-side of the polyurethaneurea coating is an isocyanate-terminated prepolymer prepared by reacting an excess of a diisocyanate with a difunctional polyoxyalkylene polyol. The isocyanate is in excess such that an NCO-group content of preferably from about 2 weight percent to about 12 weight percent, more preferably 4 weight percent to 8 weight percent is obtained. The diisocyanates employed are preferably mononuclear cyclic diisocyanates such as isophorone diisocyanate or the toluene diisocyanates, preferably a commercial mixture of 2,4- and 2,6-toluene diisocyanates. While straight chain aliphatic isocyanates such as 1,6-hexane diisocyanate may also be used, their use is less preferred. Also less preferred are the polynuclear diisocyanates such as 2,4'-, 2,2'-, and 4,4'-methylene diphenylene diisocyanates. The preferred diisocyanates are an 80:20 blend of 2,4- and 2,6-toluene diisocyanate.

The polyol component employed to react with the isocyanate to form the A-side prepolymer is a 300 to 4000 Da average molecular weight hydrophobic polyoxyalkylene diol. The term "average molecular weight" as used herein is the molecular weight calculated from the polyol hydroxyl number assuming the theoretical functionality of the polyol, not its actual, measured functionality. By "hydrophobic" is meant that the polyol contains insufficient polyoxyethylene groups to provide substantially hydrophilic segments. Such an amount is 20 weight percent or less, preferably randomly distributed, with no more than 10 weight percent as an internal or external block. Preferably, the hydrophobic polyol contains no oxyethylene moieties.

Preferably, the hydrophobic polyol is a mixture of one or more polytetramethylene ether glycols (PTMEG) and/or low unsaturation polyoxypropylene diols with an unsaturation less than 0.010 meq/g polyol. The polyol component preferably has an average molecular weight between about 500 Da and 2000 Da, more preferably between 600 Da and 1000 Da. Most preferably, mixtures of two different hydrophobic polyols, generating a polyol blend having a bimodal molecular weight distribution is employed. Most preferably, a blend of 1000 Da and 650 Da PTMEG is used. The prepolymer is prepared by conventional prepolymer techniques, i.e., by admixing the isocyanate and polyol components and heating, with or without catalyst, until the isocyanate group content stabilizes. Reference may be had to Saunders and Frisch, Polyurethanes, CHEMISTRY AND TECHNOLOGY, Wiley Interscience, New York.

Although the A-side is most preferably entirely difunctional, it would not depart from the spirit of the invention to include a small percentage, i.e., 10 equivalent percent or less, based on the diol component, of a triol, tetrol or higher functional polyether, preferably 5 equivalent percent or less. Likewise, a tri- or higher functional isocyanate could be used in similar proportions. The presence of other than difunctional components generally increases coating hardness and solvent resistance, but at the expense of increased A-side viscosity and decreased elongation and flexibility. Thus, a two-functional A-side prepolymer is desired.

The B-side comprises a diamine and a polyol. The diamine is preferably a sterically hindered diamine such as diethyltoluene diamine, although other diamines such as 2,4-, 2,6-, and 3,5-toluene diamine, ethylene diamine, 1,6-diaminohexane, isophorone diamine, and the like may also be used. Bi- or polynuclear diamines such as 2,2'-, 2,4'-, and 4,4'-methylenedianiline may also be used.

The polyol components of the B-side may be the same polyols as used in the A-side prepolymer, although a mixture of polyols is not preferred. The polyol may preferably be a 200 Da to 4000 Da PTMEG or low unsaturation polyoxypropylene diol, more preferably 400 Da to 2000 Da. Most preferably, a polyoxypropylene diol is employed with diethyltoluene diamine (DETA) in a DETA/polyol weight ratio of about 2:1. The polyoxypropylene diol may be a low unsaturation diol.

The coating is preferably clear, although pigments may be added if desired. Suitable pigments include those commonly known, for example titanium dioxide, iron oxides, metal chromates, metal sulfides, and the like, as well as organic pigments of a wide range of chemical constitution and color. Preferably, no pigments are added. The coating may also contain conventional additives such as flow control agents, rheology modifiers, etc. However, it has been found that such are generally unnecessary.

It is also possible to employ the present coating composition as a base coat, and to spray a top coat, preferably a pigmented top coat, over the polyurethaneurea base coat. Primer coats are generally used, but are not always necessary. A preferred primer is NR-9500 primer, a two-part primer available from Normac Adhesive Products, Inc., Burlington, Ontario, Canada. Primer thickness is generally rather thin, for example between 12.5 µm and 25 µm. The primer is generally applied to surfaces which have been cleaned and degreased by conventional methods.

It has been found that the coatings employed in the inventive process provide a pleasing, aesthetic appearance without the expenditure of numerous man hours or priming, sanding, filling, and other steps. Unlike the majority of other coatings, it is also possible to provide a clear coat of the polyurethaneurea, optionally with underlying primer, whereas many competing products rely on heavy loadings of pigments and finely divided metals to provide corrosion resistance.

Upon drilling through a coating structure, it is still advisable to employ a gel-like or grease-like protectant, i.e., a teflon-containing protectant such as Tefgel™, available from Ultra Safety Systems, to cover exposed bare metal. This is especially so when fasteners of a different material are used, allowing the possibility of galvanic corrosion to occur between dissimilar metals. Teflon coated stainless steel fasteners are recommended for the same reason. However, unlike other coatings which blister, crack, peel, or separate despite such precautions, the present coatings perform exceedingly well over long periods of time despite penetration of the polyurethaneurea coating down to the bare metal.

Particularly preferred A-side and B-side are those previously described, and also those described in U.S. Pat. No. 4,267,299, incorporated herein by reference. A particularly preferred system is NR-95LVHS plural component sprayable urethane, available from Normac Adhesive Products, Inc., Burlington, Ontario, Canada. This product is a TDI prepolymer of a mixture of 650 Da and 1000 Da PTMEG glycols (A-side) and a 2:1 by weight blend of DETA and polyoxypropylene diol as the B-side.

The viscosity of the A and B components, particularly the A component, is generally rather high at room temperature, and thus it is preferred to heat the components prior to mixing and spraying to reduce their viscosity when necessary. The component(s) are preferably heated to a temperature where the most viscous of the two components has a viscosity of 500 cp or less. It is generally impractical to apply the coating at component temperatures in excess of 200° F., and temperatures below 180° F. are preferred. With the preferred system, spraying temperatures of 150–160° F. have proven practical.

Conventional spray equipment suitable for handling heated components may be used for application. The A and B sides are supplied from separate pails, drums, or tanks, and are heated in line prior to being mixed when the component(s) viscosity warrants. Mixing may take place prior to the spray head by mechanical or static mixing, i.e., by an in line static mixer, or may take place in the spray head itself. The A and B ratios can be adjusted to provide the desired NCO/OH ratio. An NCO/OH ratio of 0.85 to 1.15 is preferably used, more preferably 0.90 to 1.10, and most preferably 0.95 to 1.05. The latter ratio has proven to be very satisfactory. With the most preferred system, the A-side is supplied in a 2:1 volume ratio with the B-side.

A preferred spray application system is the TBM spray system available from Normac Adhesive Products, Inc. This system employs a heated A-side with both static mixing as well as impingement mixing, along with individual piston-type pumps for the respective sides to eliminate ratio variances due to viscosity changes. The spray gun is the Probler gun manufactured by Glass Craft, with an adapter to fit Graco RAC IV spray tips.

When a primer coat is utilized, the polyurethaneurea coating is preferably applied within a time frame of 1 to 24 hours. The polyurethaneurea coating is generally applied in a thickness of minimally 10 mil, and as high as 500 mil or higher. It is noted that the polyurethaneurea has substantial strength and modulus, and therefore decreased part weight can be employed, compensating by employing a thicker polyurethaneurea coating. The coating is typically applied at a thickness of 10 to 60 mil, preferably 20 to 40 mil per coat, with additional coats used to supply the total coating thickness desired. Additional coats are preferably applied prior to complete cure of the previous coating, in particular within two hours from application of the first coat. If this preferred application window is missed, further treatment of the prior coating surface, i.e., sanding, steel wooling, grit blasting, solvent-treating, etc., may be necessary for fall adhesion.

The present invention also pertains to marine structures having a metal frame, a thin surface of plastic or fiber-reinforced polymer over the frame, and a substantial layer, i.e., preferably from 100 to 200 mil or higher of a polyurethaneurea coating which provides form-holding capability to the structure, i.e., supplies a considerable portion of the overall rigidity of the structure. Substructures of aluminum and thin plastic film of a thickness similar to that of shrink wrap may be coated to form a substantial structure by this process, for example.

EXAMPLE 1

Aluminum coupons are sprayed with Normac NR-9500 primer and then with the two-part polyurethaneurea system described above, and tested for salt water corrosion as per ASTM B117-1997. Test coupons showed no blistering or other signs of corrosion after 192 hours.

EXAMPLE 2

A test coupon is prepared as in Example 1 and the surface is scratched to penetrate the coating. The penetrated surface is exposed to salt spray under ASTM B117. No blistering is observable after 3000+ hours.

Numerous coating systems not within the subject invention were applied to aluminum substrates and tested for salt spray corrosion, including coatings containing aluminum, lead pigments, and zinc compounds. All exhibited corrosion and blistering of paint after only a short time of exposure to salt spray. The extreme resistance of the subject coatings to corrosion is exceptionally unexpected and surprising, particularly with respect to the numerous competitive coatings which were examined and which failed to provide adequate corrosion resistance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process of imparting corrosion resistance to a substrate for use in a marine environment by coating said substrate with a polyurethaneurea, said process comprising:
   mixing
   a) an A-side of a polyurethaneurea coating comprising an isocyanate-terminated prepolymer prepared by reacting an excess of a diisocyanate with at least one hydrophobic polyoxyalkylene diol having a molecular weight of from 400 Da to 4000 Da;
   with
   b) a B-side containing a diamine and a hydrophobic polyoxyalkylene diol having a molecular weight determined by its hydroxyl number of from 200 Da to 4000 Da, in a weight ratio of diamine to hydrophobic polyoxyalkylene diol of from 1:10 to 10:1;
   to form a curable polyurethaneurea mixture having an NCO/OH ratio of from 0.85 to 1.15;
   c) spraying said curable mixture onto said substrate, and curing said mixture to form a polyurethaneurea coating on said substrate.

2. The process of claim 1, wherein at least one hydrophobic polyoxyalkylene diol is selected from the group consisting of polytetramethylene ether glycols and low unsaturation polyoxypropylene diols.

3. The process of claim 1, wherein the ratio of diamine to hydrophobic polyoxyalkylene diol in said B-side is from 3:1 to 1:3.

4. The process of claim 1, wherein said A-side polyoxyalkylene diol comprises at least one polytetramethylene ether glycol having a molecular weight between 500 Da and 1000 Da and a further polyoxyalkylene diol such that a diol component having a bimodal molecular weight distribution is reacted with said diisocyanate.

5. The process of claim 1, wherein said diisocyanate is toluene diisocyanate.

6. The process of claim 1, wherein said diamine comprises diethyltoluene diamine.

7. The process of claim 1, wherein said A-side and said B-side have viscosities of 500 cp or less at 160° F.

8. The process of claim 1, wherein said substrate comprises brass, bronze, bright metal, zinc, magnesium, aluminum, non-stainless steel, or stainless steel.

9. The process of claim 1, wherein said substrate comprises non-stainless steel, magnesium, or aluminum.

10. The process of claim 1, wherein said substrate comprises a fiber-reinforced polymer.

11. The process of claim 1, wherein said substrate comprises both a metal and a fiber-reinforced polymer.

12. The process of claim 1, wherein said substrate is first coated with a primer coating prior to coating with said polyurethaneurea.

* * * * *